Figure 1:
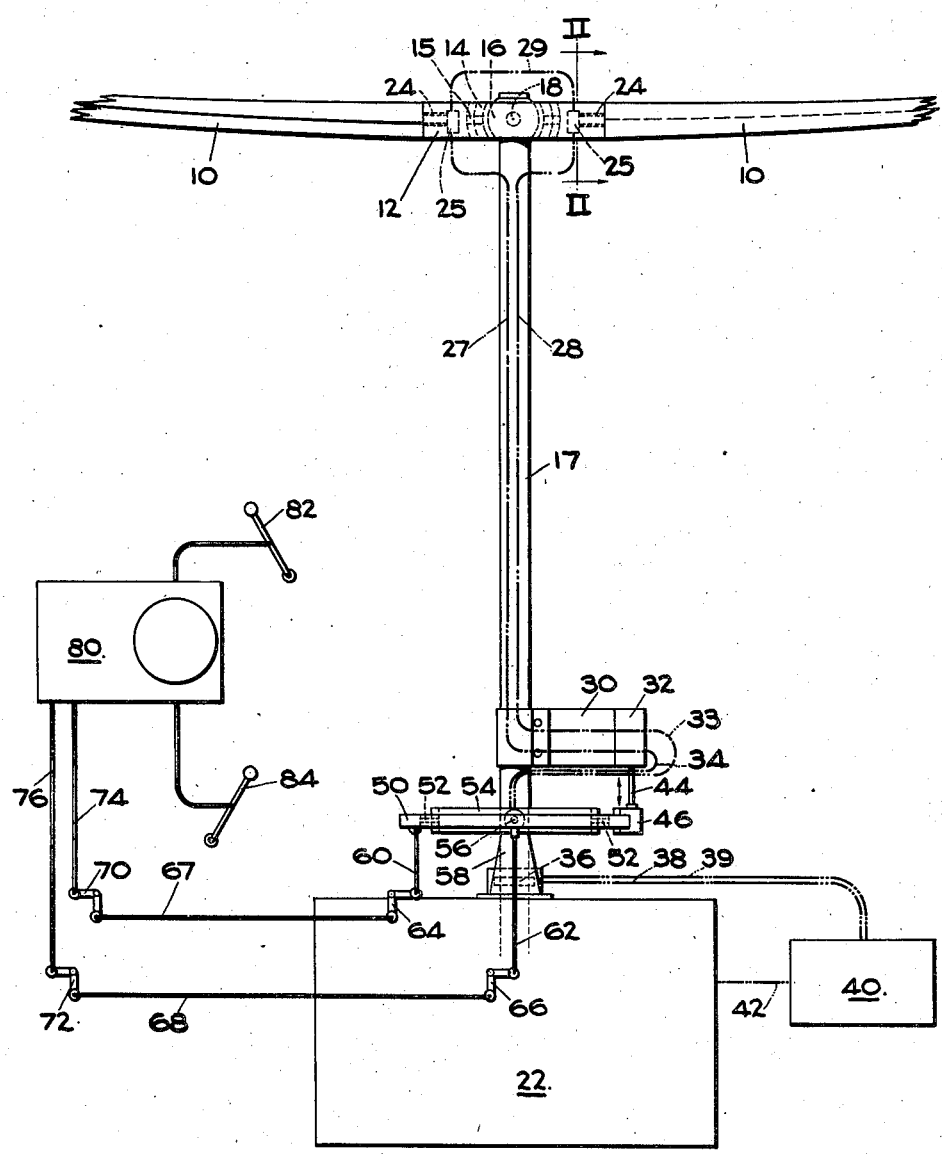

Sept. 23, 1947.    R. J. WOODS    2,427,939
ROTARY WING PITCH CHANGING MECHANISM
Filed June 14, 1944

INVENTOR
ROBERT J. WOODS
BY
Bean, Brooks, Buckley & Bean.
ATTORNEYS

Patented Sept. 23, 1947

2,427,939

UNITED STATES PATENT OFFICE 2,427,939

ROTARY WING PITCH CHANGING MECHANISM

Robert J. Woods, Grand Island, N. Y., assignor to Bell Aircraft Corporation, Buffalo, N. Y.

Application June 14, 1944, Serial No. 540,255

6 Claims. (Cl. 244—17)

This invention relates to rotary wing aircraft, and more particularly to improvements in automatic flight stabilizing and maneuvering control means for helicopter aircraft and the like.

One of the objects of the invention is to provide in helicopter type aircraft improved means for actuating the rotor blade pitch change mechanisms thereof so as to be normally operable to provide the aircraft to be automatically stable in flight, yet manually controllable at all times for directional maneuvers of the aircraft.

Another object of the invention is to provide a helicopter rotor blade pitch control system which is of improved mechanical simplicity, and which eliminates previous difficulties with respect to "lost motion" in the controls and consequent "hunting" and vibration difficulties. Another object of the invention is to provide an aircraft control arrangement of the character aforesaid which embodies improved servo control features. Other objects and advantages of the invention will appear from the specification hereinafter.

Figure 2:
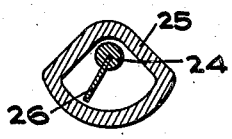

In the drawing:

Fig. 1 is a diagrammatic illustration of a helicopter rotor drive and control arrangement of the invention; and Fig. 2 is a section, on an enlarged scale, along line II—II of Fig. 2.

The drawing illustrates the invention in conjunction with a helicopter type rotor comprising a pair of rotor blades 10—10 extending radially from a hub 12 which is in turn pivotally mounted upon a gimbal ring 14 by means of diametrically opposed pins 15—15. The gimbal ring 14 is in turn pivotally mounted upon a ball-shaped head portion 16 of the rotor drive shaft or mast 17 by means of opposed pins 18—18 having axes directed transversely of the direction of the axis of the pins 15—15. Hence, the hub 12 is mounted for universal rocking upon the head 16 of the rotor mast 17 which extends vertically of the aircraft and into driving connection with the aircraft engine which is designated generally at 22. The blades 10—10 are carried upon the hub 12 by means of stub shafts 24—24 so as to be freely rotatable about longitudinal axes of the blades 10—10 for changing the effective incidences of the blades. Thus, it will be appreciated that the aircraft engine 22 is coupled to the shaft 17 so as to cause the blades 10—10 to rotate about the vertical axis of the shaft 17 to provide aircraft lift forces, and that the blades 10—10 are selectively adjustable as to their effective incidences against the relative air. It will be further appreciated that inasmuch as the hub 12 is universally inclinable relative to the mounting shaft 17, any cyclical pitch adjustments of the blades 10—10 relative to the hub will cause the blades to generate forces tending to shift the plane of the rotor track. Also, it is to be understood that the rotor may be of any other suitable form, such as to comprise for example only one blade, or three or more blades, as may be dictated by operational requirements.

In any case rotor control means of the invention embodies separate fluid-pressure actuated motor means for each blade of the rotor for pitch change adjustments thereof; and as shown in the drawing such motor means may comprise vane-piston type hydraulic motors 25—25 carried by the hub structure 12. Thus, as shown in Fig. 2, the motor cases 25—25 may be rigidly carried by the hub 12 while the motor vanes 26—26 are keyed to the corresponding blade stub shafts 24—24 for driving the latter to rotate relative to the hub 12 in response to application of fluid pressure differential forces at opposite sides of the motor vanes. The motor pressure supply means comprises a constantly pressured variable displacement system, and in the drawing is shown to comprise a pair of conduits 27—28 which lead, respectively, into the motor cases 25—25. A pressure equalizer conduit 29 provides the motor cases 25—25 to be in open communication at opposite sides of their respective pistons, whereby it will be understood that alternately reverse direction application of pressured fluid upon the dual conduit system 27—28 will cause the pistons of the motors 25—25 to rotate the blades 10—10 so as to produce opposite pitch change effects thereon.

To control such application of pressure fluid to the motors 25—25 for the purposes set forth hereinabove the conduits 27—28 are disposed to extend either internally of or alongside the rotor drive shaft 17 from the region of the rotor hub and thence laterally in connection with a valve arm 30 which is keyed to the shaft 17 to rotate as a unit therewith. The arm 30 carries at its outer end a vertically displaceable spool valve device 32. Valve feed conduits 33—34 are similarly carried by the arm 30 to rotate therewith and to discharge into suitable ports of the valve device 32. The intake ends of the feed conduits 33—34 are arranged in open communication, through means of a collector ring device 36 at the base of the shaft 17 with a pair of companion conduits 38—39 leading from a hydraulic pump 40 which is geared to the aircraft engine 22 by means of a coupling 42.

The valve control stem for the valve device 32 is illustrated at 44 to extend vertically into the valve casing and to carry at its lower end a shoe 46 which fits about the periphery of a control ring 50 and slidably embraces the latter so as to be free to rotate with the valve arm 30 about the axis of the shaft 17 while being vertically guided by the attitude of the ring 50. The ring 50 is carried by means of diametrically opposed pins 52—52 upon a gimbal ring 54 which is in turn pivoted about a transverse axis by pins 56 connected to paired brackets 58—58 extending from the engine case 22 concentrically of the vertical axis of the shaft 17.

The angular disposition of the ring 50 relative to the aircraft frame is arranged to be controlled by a pair of push-pull members 60—62 which connect to the ring 50 at 90° spaced intervals radially of the axis of the mast 17, and the push-pull members extend from the control ring into pivotal connections with corresponding bell cranks 64—66 which are carried by the aircraft frame and arranged to be selectively actuated by corresponding linkage devices such as struts 67—68; bell cranks 70—72; and struts 74—76 leading into operative connection with the roll and pitch control elements of a modified artificial horizon type aircraft automatic pilot unit, such as is designated generally at 80. It will be understood that the automatic pilot unit 80 may comprise any suitable arrangement of paired gyroscopic devices which are automatically operable to produce control motions of the struts 74—76 in response to deviations of the aircraft body attitude relative to its roll and pitch axes subsequent to establishment of a flight equilibrium system.

For example, whenever the aircraft rotor tends to pitch or swing to one side or the other as in response to wind gusts or shifting of weights, or the like, the motion of the aircraft frame so induced is translated into shifting of the automatic pilot support frames so as to cause the gyroscopic elements of the automatic pilot which control pitching and rolling motions of the aircraft to actuate the corresponding control linkages automatically so as to tilt the ring 50 about either one or both of the pivotal axes of its mounting whereby to incline the control ring downwardly in a direction lagging by approximately 90 degrees the direction of tilting of the aircraft. Thus, the control valve stem 44 will be caused to move away from normal "neutral" position relative to the conduits 27—28 and to reciprocate relative thereto cyclically with the rotor rotation as the shoe 46 follows the now inclined track of the control ring 50. The valve stem 44 is thus arranged to shift the armature of the valve device 32 whereby to interconnect the output and return ports of the pump 40 alternately with the conduits 27—28, respectively, whereby the pressure differentials within the conduit and motor systems will produce simultaneously opposite pitch change rotations of the blades 10—10, alternately in opposite directions throughout each cycle of rotation of the rotor about the vertical axis of the mast 17.

The cyclic pitch change effects so produced in the rotor blades will cause the angle of attack of the blade advancing relative to the airstream externally of the aircraft to be either increased or decreased while the angle of attack of the blade retreating relative to the airstream is simultaneously decreased or increased, as the case may be. Hence, the plane of the rotor track will tend to be shifted so as to apply a corrective influence maintaining the rotor in stable operation. The fluid conduit system of the control mechanism is provided to embody restrictions to fluid flow sufficient to cause slight lagging of the corrective influences relative to the disturbing influences whereby the automatic control system tends to damp all instability tendencies of the aircraft, and the aircraft is therefore automatically stable in flight.

As indicated at 82—84, a pair of manual adjustment devices may be provided in conjunction with each gyroscopic elements of the automatic pilot unit 80, whereby to enable flight personnel to overrule the normal operation of the automatic pilot unit to such extent as to alter the direction of the aircraft flight. If preferred, a single manually operable lever may be coupled to the levers 82—84, and arranged to be universally pivotable in the manner of a conventional aircraft joystick to actuate the levers 82—84 either singly or together; but in any case it will be arranged that manual shifting of the levers 82—84 will cause the plane of the control ring 50 to temporarily incline relative to its normal plane in parallel with the plane of the rotor track, whereby to cause the blade pitch change mechanism to procure shifting of the plane of the rotor track as explained hereinabove. This in turn generates horizontal displacement force changes for controlling the direction and speed of the aircraft flight, while the automatic pilot operation continues at all times as explained hereinabove to provide an automatically stable flight operation.

A particular feature and advantage of the invention resides in the simplification of the rotor blade mounting arrangement and in the pitch changing motor mechanisms thereof compared to purely mechanical arrangements. Whereas the constantly pressured fluid control system of the invention firmly "locks" the blades of the rotor at all and any positions of pitch change adjustments thereof, the devices of the prior art such as referred to hereinabove invariably introduce undesirable lost-motion effects and complications in connection with their mechanical displacement devices which are designed to function in the presence of universal inclinations of the rotor hub relative to the supporting mast. Also, such linkage systems of the prior art are invariably bulky and add substantially to the airstream drag effects; and are extremely difficult to maintain in accurate adjustment and repair, even by expert workmen. On the other hand, it will be understood that the pressured fluid conduits of the present invention, in the regions of their extensions from the rotor mast into connection with the blade pitch change motors, may comprise simple flexible conduits adapted to conform freely to changes in attitude of the rotor relative to the mast; thereby further obviating all the mechanical problems and difficulties of the prior art.

Although only one specific form of the invention has been shown and described in detail, it will be understood that various changes may be made therein without departing from the spirit of the invention and the scope of the appended claims.

I claim:

1. In an aircraft in combination, a rotor comprising a hub and blade means extending radially therefrom and mounted for pitch change, means mounting said hub upon said aircraft to permit universal inclination of the plane of the rotor with respect to the aircraft, a control track member mounted upon said aircraft for universal inclination of said track member relative to said aircraft about an axis extending in the general direction of the axis of rotation of said rotor, fluid pressure motor means carried by said hub and operably coupled to said blade means for controlling the effective incidence thereof, fluid valve means carried by said aircraft, pressured fluid supply means carried by said aircraft, fluid conduit means connecting said supply means and said valve means and said motor means, valve actuating means connected to said rotor so as to rotate therewith and coupled to said track means so as to be displaced thereby cyclically of said rotor operation, and gyroscopic means carried by said aircraft and operably coupled to said track member for adjusting the inclination thereof automatically in response to deviations of the attitude of the aircraft from normal.

2. In an aircraft, in combination, a rotor comprising adjustable pitch blade means, means mounting said blade means upon said aircraft to permit universal inclination of the plane of rotation thereof with respect to the aircraft, a control member mounted upon said aircraft for universal inclination of said control member relative to said aircraft, fluid pressure motor means carried by said rotor and operably coupled to said blade means for controlling the effective incidence thereof, fluid valve means carried by said rotor to rotate therewith, pressured fluid supply means carried by said aircraft, fluid conduit means connecting said supply means and said valve means and said motor means, valve actuating means coupled to said control member so as to be actuated thereby in conjunction with said rotor operation and cyclically thereof, and means carried by said aircraft and operably coupled to said control member for adjusting the inclination thereof.

3. In an aircraft, in combination, a rotor comprising diametrically opposed blades, means mounting said rotor upon said aircraft for blade incidence change about a longitudinal axis of said blades with respect to the aircraft, said means mounting said rotor for blade incidence change, a control track member mounted upon said aircraft for universal inclination of said track member relative to said aircraft, fluid pressure motor means coupled to said rotor for controlling the effective incidences of said blades, pressured fluid supply means carried by said aircraft, conduit means connecting said supply means and said motor means, valve means controlling the output of said supply means, valve actuating means coupled to said track member so as to be actuated thereby cyclically of said rotor operation to regulate said valve means for control of said rotor incidence change means, and automatic pilot means carried by said aircraft and operably coupled to said track member for adjusting the inclination thereof for control of said aircraft.

4. In an aircraft, in combination, a rotor comprising a hub and diametrically opposed adjustable pitch blades extending radially therefrom and mounted for pitch change, means mounting said hub upon said aircraft to permit universal rocking thereof with respect to the aircraft, a control track mounted upon said aircraft concentrically of the axis of rotation of said rotor and for universal inclination of said track member relative to said aircraft, a pair of fluid pressure motors carried by said hub and separately coupled to said blades for controlling the effective incidences thereof, valve means coupled to said track means so as to be actuated thereby cyclically of said rotor operation, pressure fluid supply means carried by said aircraft, conduit means connecting said motors in series with said valve means and said supply means, and automatic pilot means carried by said aircraft and operably coupled to said track means for adjusting the inclination thereof relative to said aircraft for control of said valve means.

5. In an aircraft, in combination, a rotor comprising a hub and diametrically opposed adjustable pitch blades extending radially therefrom, means mounting said hub upon said aircraft to permit universal rocking thereof with respect to the aircraft, a control member mounted upon said aircraft for universal inclination relative to said aircraft, a pair of fluid pressure motors carried by said hub and separately coupled to said blades for selectively controlling the effective incidences thereof, a pressured fluid supply pump carried by said aircraft, a pump control valve, conduit means connecting said pump and said valve for valve control of the output of said pump, said valve being coupled to said control member so as to be actuated upon movement thereof relative to the aircraft to control said rotor blade pitch change means, conduit means connecting said valve and said motors in series, and automatic pilot means carried by said aircraft and operably coupled to said control member for adjusting the inclination thereof for control of the flight of said aircraft.

6. In an aircraft, in combination, a rotor comprising a hub and diametrically opposed adjustable pitch blades extending radially therefrom, means mounting said hub upon said aircraft to permit universal rocking thereof with respect to the aircraft, a control member mounted upon said aircraft for universal inclination relative to said aircraft, a pair of fluid pressure motors carried by said hub and separately coupled to said blades for selectively controlling the effective incidences thereof, a pressure fluid supply pump carried by said aircraft, a pump control valve, conduit means connecting said pump and said valve for valve control of the output of said pump, and a valve regulating device coupled to said control member so as to be actuated upon movement thereof relative to the aircraft to regulate said valve for control of said rotor blade pitch change means.

ROBERT J. WOODS.

REFERENCES CITED

The following references are of record in the file of this patent:

UNITED STATES PATENTS

| Number | Name | Date |
| --- | --- | --- |
| 2,021,470 | Upson | Nov. 19, 1935 |
| 2,023,105 | Smith | Dec. 3, 1935 |
| 2,256,635 | Young | Sept. 23, 1941 |
| 1,992,970 | Sperry et al. | Mar. 5, 1935 |
| 2,023,785 | Hoover | Dec. 10, 1935 |
| 2,165,451 | Carlson | July 11, 1939 |